No. 659,003. Patented Oct. 2, 1900.
C. W. A. TAYLOR & D. SMAIL.
VALVE OPERATING MECHANISM.
(Application filed June 7, 1900.)
(No Model.) 2 Sheets—Sheet 1.
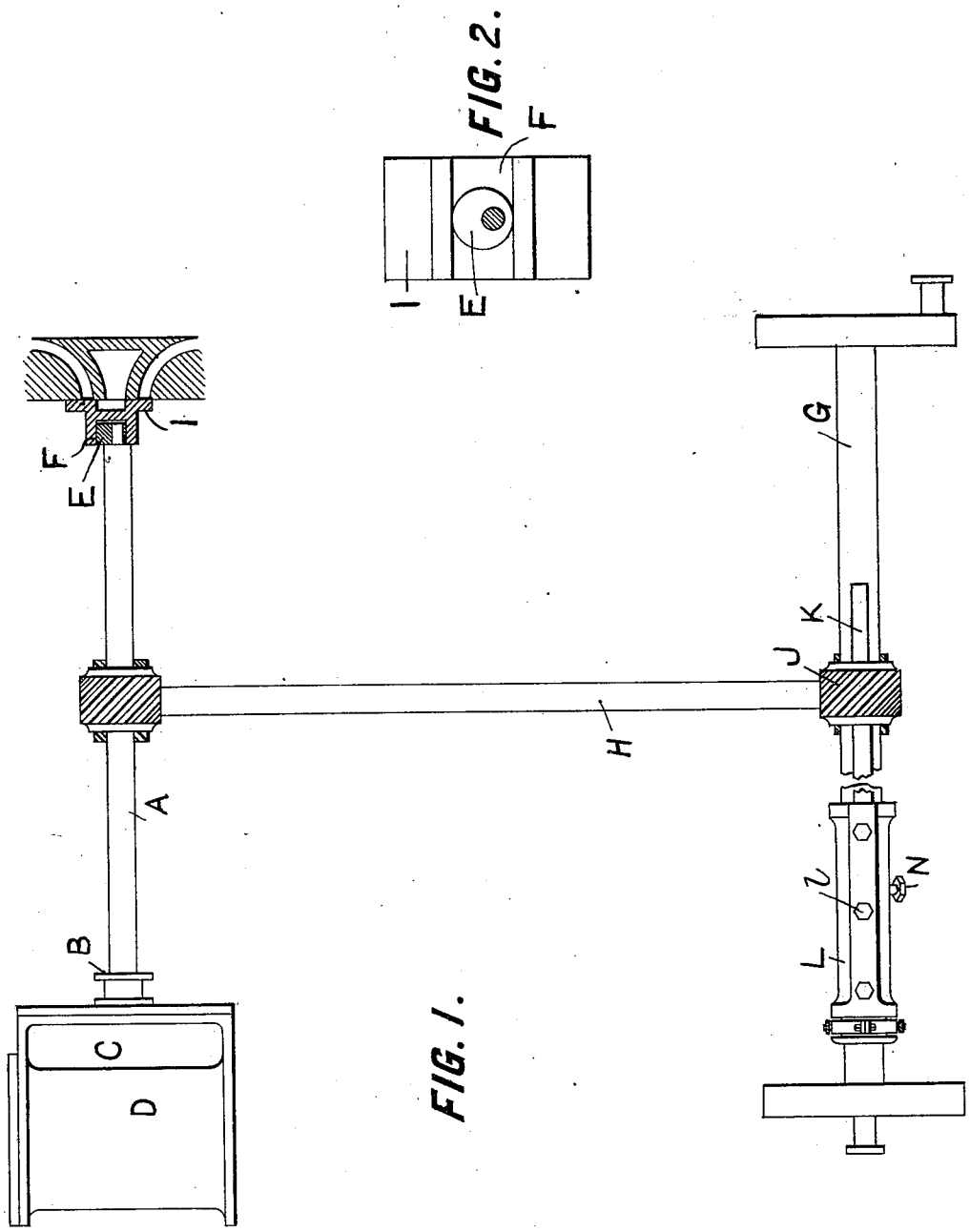
Witnesses
Inventors
Charles W. A. Taylor.
David Smail
by Henry _____ Attorney No. 659,003. Patented Oct. 2, 1900.
C. W. A. TAYLOR & D. SMAIL
VALVE OPERATING MECHANISM.
(Application filed June 7, 1900.)
(No Model.) 2 Sheets—Sheet 2.
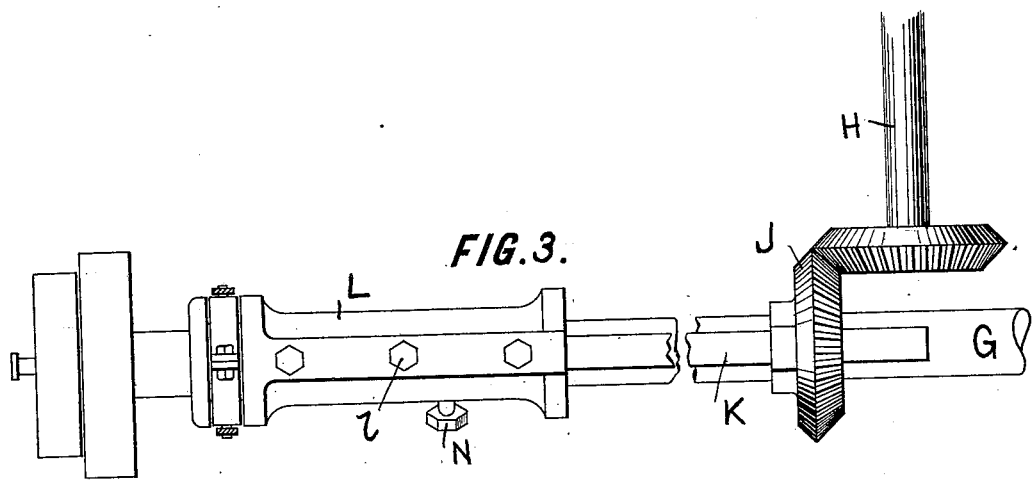
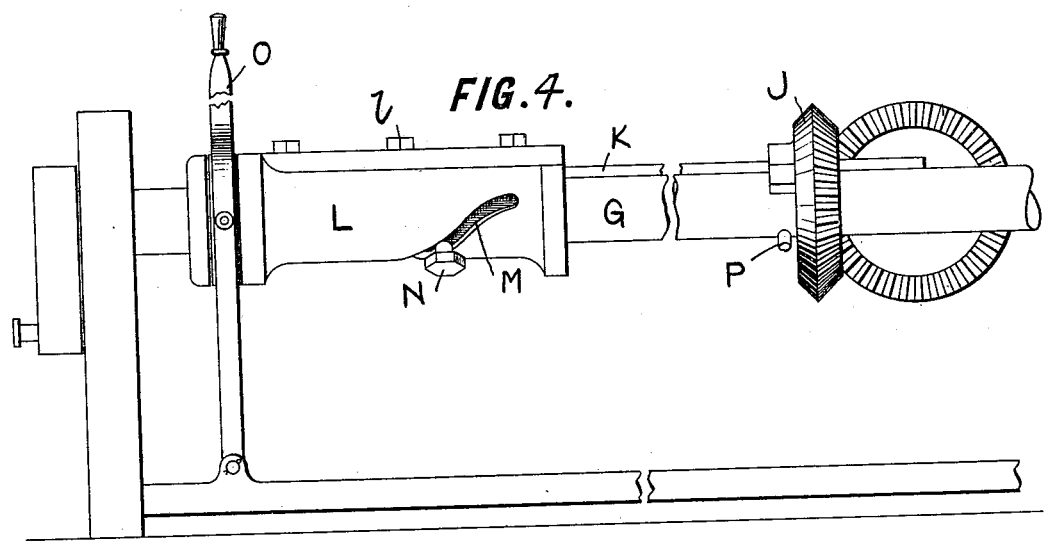
Witnesses
Inventors
Charles W. A. Taylor
David Smail
by Henry Connett
Attorney

UNITED STATES PATENT OFFICE.

CHARLES WILLIAM ALEXANDER TAYLOR, OF ALLOA, AND DAVID SMAIL, OF GLASGOW, SCOTLAND, ASSIGNORS OF ONE-THIRD TO JOHN STOREY, OF LIVERPOOL, ENGLAND.

VALVE-OPERATING MECHANISM.

SPECIFICATION forming part of Letters Patent No. 659,003, dated October 2, 1900.

Application filed June 7, 1900. Serial No. 19,412. (No model.)

*To all whom it may concern:*

Be it known that we, CHARLES WILLIAM ALEXANDER TAYLOR, residing in Alloa, county of Clackmannan, and DAVID SMAIL, residing at Partick, Glasgow, county of Lanark, Scotland, subjects of the Queen of Great Britain, (whose full postal addresses are respectively Sunnyside Road, Alloa, and 2 Edelweis Terrace, Partick, Glasgow,) have invented certain new and useful Improvements in Valve-Operating Mechanisms, of which the following is a specification.

This invention has for its object to improve the mechanism or gear actuating the slide or other distributing valves for the steam-cylinders of winches and other engines. It is designed as a substitute for the ordinary link-motion and will act as a variable cut-off or as a reversing-motion for the engine or will render the slide-valve inoperative.

The invention will be understood from the following description, reference being had to the accompanying drawings, in which—

Figure 1 is a general view of the mechanism; Fig. 2, a detail view of the eccentric device for operating the valve; Fig. 3, a detail plan view, on a larger scale, of the device for reversing the engine or rendering the valve inactive; Fig. 4, an elevation thereof; Fig. 5, a detail view showing the limiting stop device.

In carrying our invention into effect we use a spindle or shaft A, passing through suitable stuffing-boxes B in the valve-chest C of steam-cylinder D. The ends of this shaft are fitted with eccentric disks or cams E, these cams working in suitable recesses F in back of valve I and so placed relatively to one another that by revolving the shaft A the valves have respectively the required motion for opening and closing the steam-ports in the cylinders.

G is the crank-shaft of the winch, and H a cross-shaft, gearing the two shafts A and G together by means of bevel or screw gear or otherwise. In Fig. 1 screw-gear is shown and in Figs. 2 and 3 bevel-gear. The rotation of the crank-shaft G therefore will operate, through the shafts A and H, the slide-valves I of the respective cylinders. In order to reverse the engines or render the valve-motion inactive, we provide the following arrangement: J is the wheel of the bevel or screw gear, that is mounted on the shaft G. This wheel J is loosely keyed on the shaft—that is to say, the key or feather K passing through it is not a fixture on the shaft, but can be revolved around it for a certain distance or held stationary, as required. For this purpose the key or feather K is secured by the set-screw $l$ to a sleeve L, that is mounted loosely on the shaft G. This sleeve is operated by providing it with a curved slot M, in which engages a pin N in the shaft G, and by sliding this sleeve L backward or forward by means of a handle O the sleeve, with its key or feather K, is rotated a part of a turn, and consequently the gear-wheel J is also rotated on its shaft, and so shifts the position of the slide-valve.

P is a projection on the shaft G, and Q and R are two shoulders on the wheel J, adapted, respectively, to abut against the projection P when the handle is moved in one direction or the other, and thus act as stops which limit the movement of wheel J about the shaft. In the position shown on the drawings with the handle in the middle position the valve is inactive and the engine is stopped. If, however, the handle O be pulled over in one direction, the gear-wheel will be rotated so that the shoulder Q abuts against the projection P, thus pulling the gear in advance of the crank, and this results in a forward movement of the engine. If, however, the handle O be pulled over in the other direction, the gear will be rotated so that the other shoulder—namely, R—comes against the projection P, thus pulling the gear to an equal distance behind the crank and producing a backward motion of the engine. The gearing coupling the shafts A and G must be such that they shall have the same speed.

Instead of the bevel or screw gear hereinbefore described a belt or other suitable gear might even be used.

We declare that what we claim is—

1. The combination with an engine, its valve-chest, a slide-valve therein, a rotating valve-operating shaft, and an eccentric thereon and engaging said valve, of a crank-shaft, a driving toothed wheel J, mounted loosely on said crank-shaft, a limiting device to limit the extent of rotation of said wheel about the shaft, a slotted sleeve L, mounted loosely on the crank-shaft, a key K, fixed to said sleeve and slidable through the wheel J, a stud N, in the crank-shaft and engaging the slot in said sleeve, means for rotating said sleeve, and gearing between the wheel J and the valve-operating shaft for driving the latter.

2. The combination with an engine, its valve-chest, a slide-valve within said chest, a valve-operating shaft A, entering said chest, and an eccentric E, on said shaft and engaging said valve for operating the latter, of a crank-shaft G, a cross-shaft H between the shafts A and G, gearing connecting the shafts A and H, intergearing toothed wheels on the respective shafts G and H, the wheel J on the shaft G being loose on the shaft, means for limiting the extent of rotation of the wheel J, and means for rotating said wheel J on said shaft.

3. In mechanism for the purpose described, the combination with the crank-shaft G, provided with the studs N and P, the sleeve L, loose on the shaft G and provided with a spiral slot M, engaged by the stud N, the gear-wheel J, loose on the shaft G and provided with shoulders Q R to engage the stud P, and the key K, fixed to the sleeve L and playing through the wheel J, substantially as and for the purpose set forth.

In witness whereof we have hereunto signed our names, this 19th day of May, 1900, in the presence of two subscribing witnesses.

CHARLES WILLIAM ALEXANDER TAYLOR.
DAVID SMAIL.

Witnesses:
J. WATSON PURVIS,
A. MACNAB.